(12) United States Patent
Penn et al.

(10) Patent No.: US 6,857,751 B2
(45) Date of Patent: Feb. 22, 2005

(54) ADAPTIVE ILLUMINATION MODULATOR

(75) Inventors: Steven M. Penn, Plano, TX (US); Duane S. Dewald, Dallas, TX (US); Terry Bartlett, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/326,237

(22) Filed: Dec. 20, 2002

(65) Prior Publication Data
US 2004/0119950 A1 Jun. 24, 2004

(51) Int. Cl.[7] ............................................. G03B 21/14
(52) U.S. Cl. ...................................... 353/97; 353/122
(58) Field of Search ........................... 353/97, 88, 122; 359/738–740

(56) References Cited

U.S. PATENT DOCUMENTS

| | | | | |
|---|---|---|---|---|
| 4,024,552 A | | 5/1977 | Kondo | |
| 4,233,650 A | | 11/1980 | Hagner et al. | |
| 5,053,934 A | * | 10/1991 | Krebs | 362/281 |
| 5,274,480 A | * | 12/1993 | Hirai et al. | 349/5 |
| 5,277,172 A | | 1/1994 | Sugimoto | |
| 5,379,083 A | * | 1/1995 | Tomita | 353/122 |
| 5,442,414 A | * | 8/1995 | Janssen et al. | 353/98 |
| 5,519,518 A | | 5/1996 | Watanabe et al. | |
| 5,597,223 A | * | 1/1997 | Watanabe et al. | 353/97 |
| 5,633,755 A | | 5/1997 | Manabe et al. | |
| 5,662,401 A | * | 9/1997 | Shimizu et al. | 353/38 |
| 5,924,783 A | * | 7/1999 | Jones | 353/97 |
| 5,982,563 A | * | 11/1999 | Nakamura et al. | 359/727 |
| 6,220,730 B1 | * | 4/2001 | Hewlett et al. | 362/297 |
| 6,637,894 B2 | * | 10/2003 | Dewald et al. | 353/97 |
| 2002/0126264 A1 | | 9/2002 | Dewald et al. | 353/97 |

OTHER PUBLICATIONS

U.S. Appl. No. 10/331,518, filed Dec. 30, 2002, inventor Penn et al.
L.J. Hornbeck, "Digital Light Processing™: A New MEMS-–Based Display Technology," Texas Instruments, white paper, 22 pages.
G. Hewlett and W. Werner, "Analysis of Electronic Cinema Projection with the Texas Instruments Digital Micromirror Device™ Display System," Texas Instruments, white paper, 10 pages.

* cited by examiner

Primary Examiner—Christopher Mahoney
(74) Attorney, Agent, or Firm—Charles A. Brill; Wade James Brady, III; Frederick J. Telecky, Jr.

(57) ABSTRACT

An image display system includes a light source capable of generating an illumination light beam along an illumination path. The system also includes a modulator operable to receive at least a portion of the illumination light beam and to selectively communicate at least some of the illumination light beam received by the modulator along a projection light path. The system further includes at least one adjustable illumination aperture operable to selectively control an amount of the at least a portion of the illumination light beam received by the modulator based at least in part on image data.

18 Claims, 3 Drawing Sheets

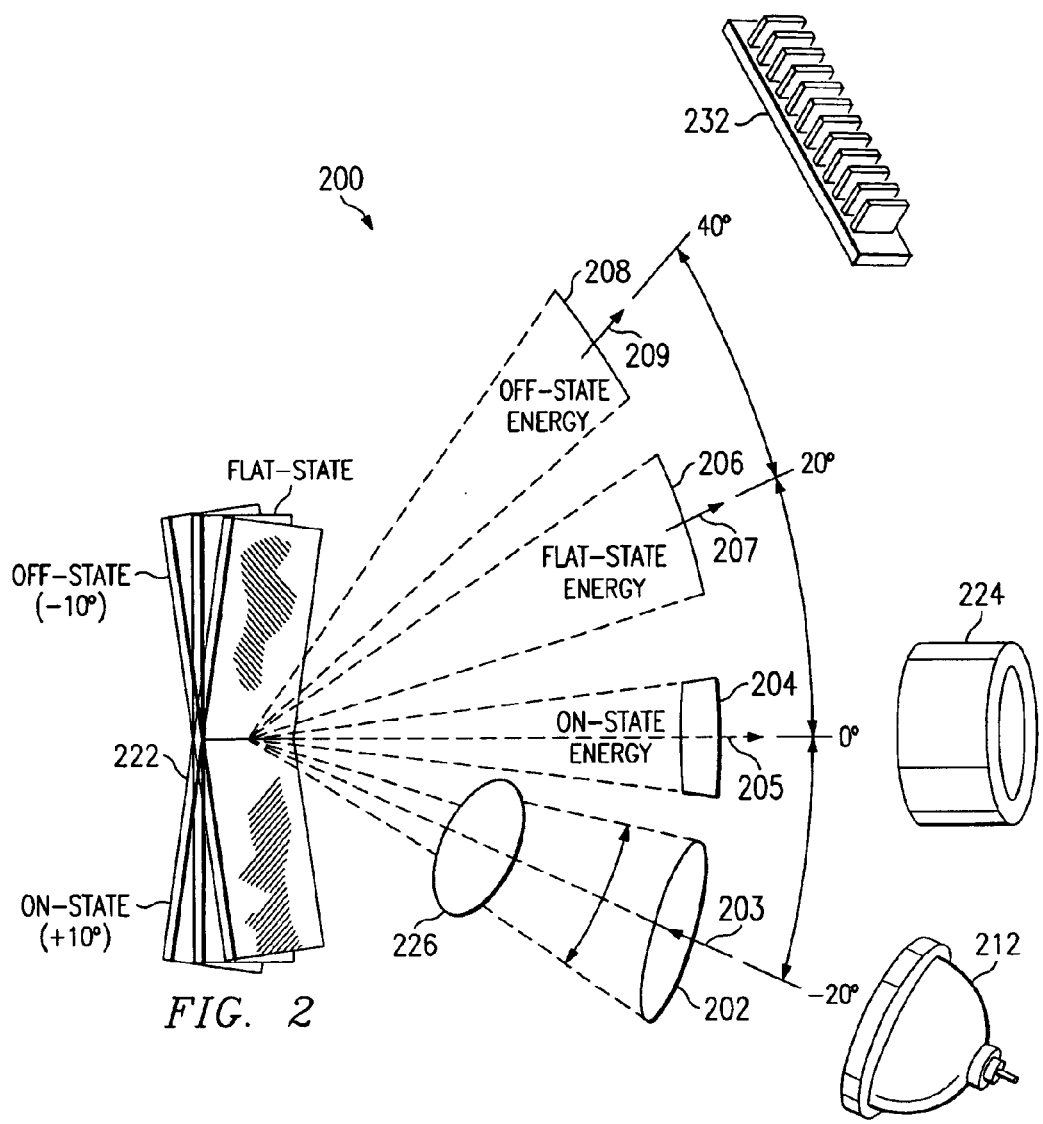
FIG. 2
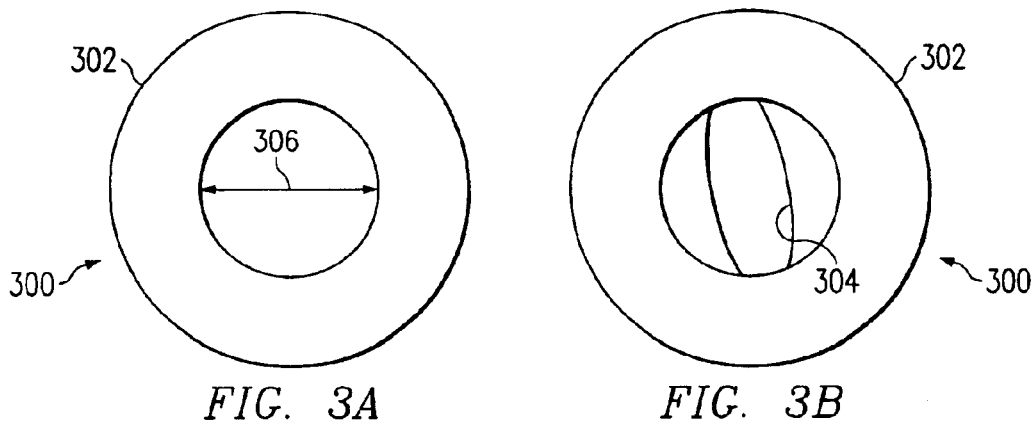
FIG. 3A
FIG. 3B

ADAPTIVE ILLUMINATION MODULATOR

TECHNICAL FIELD OF THE INVENTION

This invention relates in general to image display system, and more particularly to optical systems implementing micromirror based projection display systems.

Overview

Spatial light modulators used in projection display systems are capable of projecting image details from media sources such as HDTV, DVD, and DVI. Conventional spatial light modulators are limited in their ability to modulate light at frequencies for sufficient grayscale resolution at high contrast ratios. Inadequate grayscale resolution can prevent smooth shades of color intensity, resulting in objectionable contour lines at the transition between one area of brightness and an adjacent area of slightly different brightness.

SUMMARY OF EXAMPLE EMBODIMENTS

In one embodiment, an image display system comprises a light source capable of generating an illumination light beam along an illumination path. The system further comprises a modulator operable to receive at least a portion of the illumination light beam and to selectively communicate at least some of the illumination light beam received by the modulator along a projection light path. The system also comprises at least one adjustable illumination aperture operable to selectively control an amount of the at least a portion of the illumination light beam received by the modulator based at least in part on image data.

In another embodiment, an image display system comprises a light source capable of generating an illumination light beam along an illumination path. The system further comprises a modulator operable to receive at least a portion of the illumination light beam and to selectively communicate at least some of the illumination light beam received by the modulator along a projection light path. The system also comprises at least one adjustable projection aperture operable to selectively control an amount of the at least some of the illumination light beam communicated from the modulator based at least in part on image data.

In a method embodiment, a method of displaying an image comprises generating an illumination light beam along an illumination path. The method further comprises receiving at least a portion of the illumination light beam at a spatial light modulator. The method also comprises selectively communicating at least some of the illumination light beam received by the spatial light modulator along a projection light path. In addition, the method comprises selectively controlling an amount of the illumination light beam received by or communicated from the spatial light modulator based at least in part on image data.

Depending on the specific features implemented, particular embodiments of the present invention may exhibit some, none, or all of the following technical advantages. Various embodiments may be capable of forming additional grayscale intensity levels resulting in less visible contour lines at the transition between adjacent areas of brightness. Some embodiments may be capable of adjusting the brightness and contrast of an image based on image data and/or an ambient room environment.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention, and for further features and advantages thereof, reference is now made to the following description taken in conjunction with the accompanying drawings, in which:

FIG. 2 illustrates the effect of an adjustable illumination modulator on an illumination light cone and three reflection light cones;

FIGS. 3A and 3B illustrate one example of an adjustable aperture comprising a translating aperture;

DETAILED DESCRIPTION OF EXAMPLE EMBODIMENTS

Figure 1:
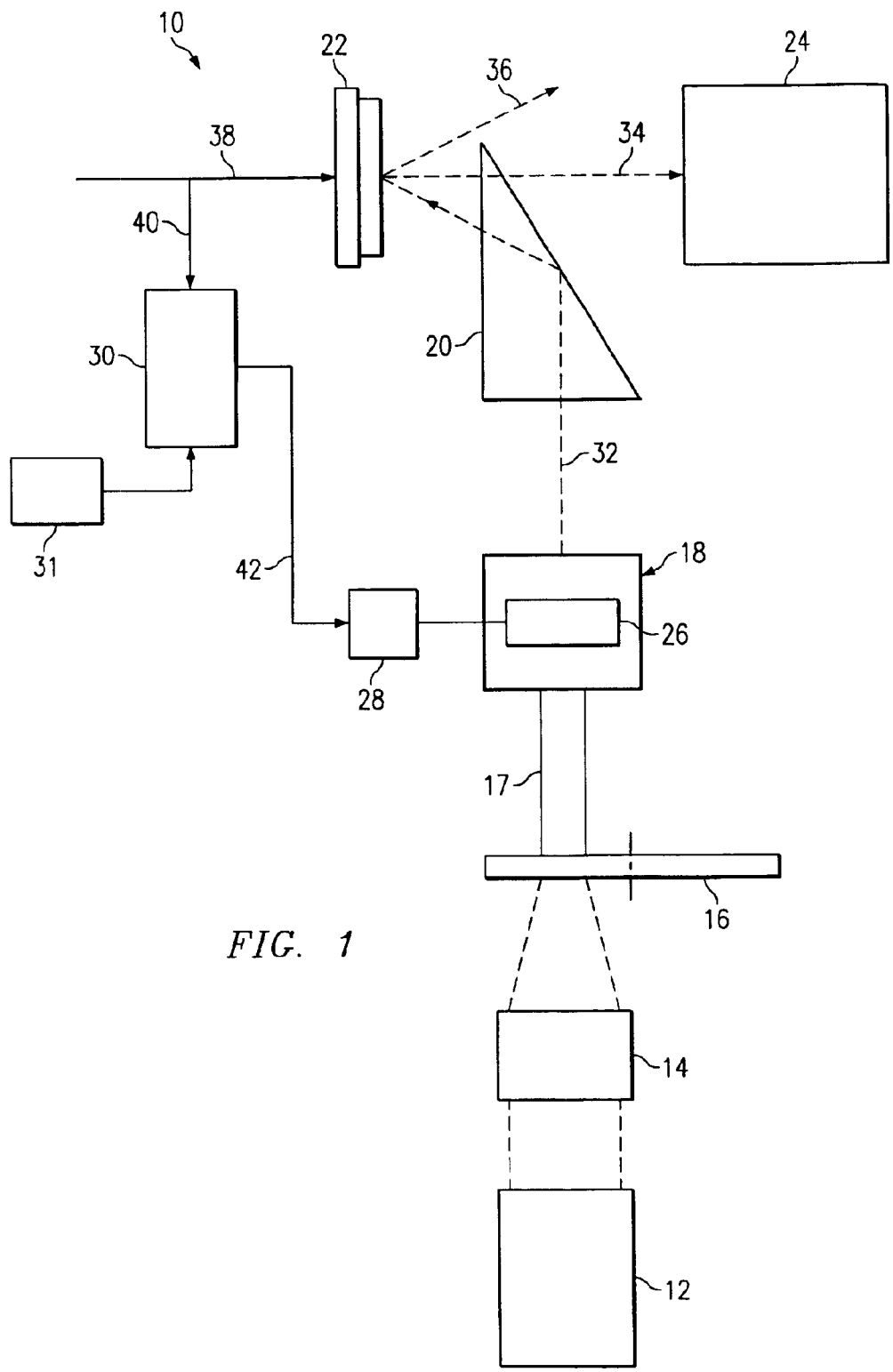
FIG. 1 is a block diagram of one embodiment of a portion of a projection display system implementing an adjustable illumination aperture.

FIG. 1 is a block diagram of one embodiment of a portion of a projection display system 10 implementing an adjustable illumination aperture 26. In this example, projection display system 10 includes a light source 12 capable of generating an illumination light beam and a first optics group 14 capable of focusing the illumination light beam on an entrance pupil of an integration rod 17. Light source 12 may comprise any light source, such as, for example, a metal halide light source or a xenon arc light source. First optics group 14 may comprise a condenser lens and/or any other suitable optical device.

In this particular embodiment, the illumination light beam passes through a color wheel 16 before entering integration rod 17. Color wheel 16 may comprise any device capable of modulating one of the primary colors (e.g., red, green, and blue), in the path of the illumination light beam. For example, color wheel 16 may comprise a scrolling color wheel or other type of recycling color wheel. Color wheel 16 enables the illumination light beam to be filtered so as to provide "field sequential" images. Color wheel 16 enables system 10 to generate a sequence of differently colored images that are perceived by a viewer through a projection lens 24 as a correctly colored image.

In this example, system 10 also includes a second optics group 18 capable of receiving the illumination light beam passing through integration rod 17 and capable of focusing the illumination light beam onto a modulator 22 through a prism assembly 20. Second optics group 18 may comprise, for example, a condenser lens and/or any other suitable optical device. Modulator 22 may comprise any device capable of selectively communicating at least some of the illumination light beam along a projection light path 34 and/or along an off state light path 36. In various embodiments, modulator 22 may comprise a spatial light modulator, such as, for example, a liquid crystal display or a light emitting diode modulator.

In this particular embodiment, modulator 22 comprises a digital micro-mirror device (DMD). The DMD is an electromechanical device comprising an array of thousands of tilting mirrors. Each mirror may tilt plus or minus ten degrees for the active "on" state or "off" state. To permit the mirrors to tilt, each mirror is attached to one or more hinges mounted on support posts, and spaced by means of an air gap over underlying control circuitry. The control circuitry provides electrostatic forces, based at least in part on image data 38 received from a processor (not explicitly shown).

The electrostatic forces cause each mirror to selectively tilt. Incident illumination light on the mirror array is reflected by the "on" mirrors along projection path 34 for receipt by projection lens 24 and is reflected by the "off" mirrors along off state light path 36 for receipt by a light dump. The pattern of "on" versus "off" mirrors (e.g., light and dark mirrors) forms an image that is projected by projection lens 24.

In this particular embodiment, display system 10 includes at least one adjustable illumination aperture 26 contained within second optics group 18. Illumination aperture 26 is contained within second optics group 18 at the illumination pupil or "stop". Adjustable illumination aperture 26 may comprise any device, such as, for example, a translating aperture, a rotating aperture, a rotating valve aperture, a sliding gate aperture, or any other device capable of selectively varying the amount of light received by modulator 22.

In this example, adjustable illumination aperture 26 operates to supplement the modulation function of modulator 22 by selectively varying the amount of the illumination light beam received by modulator 22. One aspect of this disclosure recognizes that selectively varying the amount of light that illuminates modulator 22 can increase the contrast ratio of system 10 and/or reduce the gray-level contour artifacts by providing additional levels of grayscale intensity. Specifically, by selectively opening and closing apertures placed in the illumination path, the black level of the DMD image can be adjusted upward or downward. This modulation of the illumination light beam can be achieved on a frame-by-frame basis. The term "frame" refers to a complete image displayed by the spatial light modulator and represented by a set of display data. The modulation frequency could be further increased to modulate pixel "on" and "off" times within a frame. Using today's DMD frame period as an example, mechanisms to control aperture size can be made sufficiently fast so as to change aperture size as fast or faster than 5 milliseconds, well within the DMD frame period of 16 milliseconds.

In this particular example, adjustable illumination aperture 26 operates to selectively vary the amount of illumination light received by modulator 22 at a relatively low frequency. In one non-limiting example, aperture 26 can operate to selectively vary the amount of illumination light at one (1) millisecond or more. Varying the amount of illumination light received by modulator 22 can advantageously adjust brightness and/or contrast of the projected image. For example, for a bright scene, adjustable illumination aperture 26 can operate (e.g., open) to make optimal use of the available amount of the illumination light beam received by modulator 22. Likewise, for darker scenes, aperture 26 can operate (e.g., close) to proportionately reduce the amount of the illumination light beam received by modulator 22 and to increase, the contrast ratio of the projected image. In some cases, the brightness and contrast of the projected image can be varied by aperture 26 on a frame-by-frame or a multiple frame basis. Image data 38 may comprise, for example, an image content, a color content, an integrated intensity of the image frame, a peak to peak intensity value of the image frame, and/or a subjectively weighted area, such as the center of the image. In some embodiments, image data 38 can comprise data compiled from analyzed histogram data.

In other embodiments, adjustable illumination aperture 26 can be selectively varied based on image data 38 and/or an ambient room environment. Controlling adjustable illumination aperture 26 based at least in part on the ambient room environment advantageously allows system 10 to automatically adjust the projected image as the ambient room environment changes. For example, in a brightly lit room, adjustable illumination aperture 26 can operate (e.g., open) to make optimal use of the available amount of the illumination light beam received by modulator 22. Similarly, for darker ambient room conditions, aperture 26 can operate (e.g., close) to proportionately reduce the amount of the illumination light beam received by modulator 22.

In yet other embodiments, adjustable illumination aperture 26 can selectively vary the intensity of the illumination light beam while maintaining a relatively constant contrast. In other words, aperture 26 can lower or raise both the lowest gray-scale level and the highest gray-scale level, while maintaining a desired separation (e.g., contrast) between the highest and lowest grayscale levels. In some cases, aperture 26 can selectively vary the intensity of the illumination light beam based on image data 38 and/or an ambient room environment.

In still other embodiments, adjustable illumination aperture 26 can operate to selectively vary the amount of illumination light received by modulator 22 at a relatively high frequency. In one non-limiting example, aperture 26 can operate to selectively vary the amount of illumination light at fifteen (15) microseconds or less, which, in some cases, can be less than the modulation cycle or pulse time of modulator 22. Modulating aperture 26 at a rate faster than a modulation rate of modulator 22 advantageously enables system 10 to further enhance the brightness and/or contrast of a projected image. In some cases, aperture 26 can selectively vary the intensity of the illumination light beam based on image data 38 and/or an ambient room environment.

In this example, system 10 includes a control module 30 capable of communicating a control signal 42 to a control motor 28. Control module 30 operates to control the position of adjustable illumination aperture 26 based at least in part on image data 38 received from a feedback loop 40. In other embodiments, control module 30 can operate to control the position of aperture 26 based on image data 38 and/or an ambient room environment. In this particular embodiment, control module 30 generates control signal 42 according to an image intensity algorithm that analyzes image data 38 received from feedback loop 40. In other embodiments, image intensity algorithm can incorporate image data 38 and/or an ambient room environment data received from an ambient light sensor 31.

Control motor 28 receives control signal 42 and selectively manipulates adjustable illumination aperture 26 to vary the amount of illumination light received by modulator 22 and to adjust the contrast ratio of the projected image. Control motor 28 may comprise any device, such as, for example, a fast-acting linear actuator, a galvanometer type actuator, or a rotary actuator. Control motor 28 may be suitably implemented with a voice coil motor, such as those used for disk drive units in computers.

As indicated above, the opening and closing of aperture 26 is responsive to certain parameters, notably, scene brightness and/or ambient light in the viewing environment. Control unit 30 may include a look up table or other means for associating these parameters with the rate and extent to which aperture 26 is opened or closed.

In this particular embodiment, system 10 includes at least one adjustable illumination aperture 26. In various embodiments, system 10 can exclude adjustable illumination aperture 26 and include at least one adjustable projection aperture (not explicitly shown) located at any point along projection path 34, preferably located at the projection lens stop. The structure and function of the adjustable projection aperture can be substantially similar to adjustable illumination aperture 26. In other embodiments, system 10 can include both an adjustable illumination aperture 26 and an adjustable projection aperture. Where system 10 implements both adjustable illumination aperture 26 and the adjustable projection aperture, it can be advantageous to match the size and the shape of the projection aperture with the size and shape of adjustable illumination aperture 26.

FIG. 2 illustrates the effect of an adjustable illumination modulator 226 on an illumination light cone 202 and reflection light cones 204, 206, and 208. In this example, a projection display system 200 includes a light source 212 capable of generating illumination cone 202 centered on illumination ray 203 and a modulator 222 capable of receiving at least a portion of illumination cone 202. The structure and function of light source 212 and modulator 222 can be substantially similar to light source 12 and modulator 22 of FIG. 1, respectively. In this example, modulator 22 is represented as a single micromirror element that is operable to tilt up to ten degrees in one of two directions (e.g., an "on" state direction and an "off" state direction).

In this example, the light path of illumination cone 202 strikes the micromirror element at an angle of approximately twenty (20) degrees relative to the normal of the mirror when the mirror is in a flat state or an untilted position. When the micromirror element of modulator 222 is tiled in the "on" state direction, the portion of illumination cone 202 received by modulator 222 is reflected approximately normal to the surface of a projection lens 224. Similarly when the single micromirror element of modulator 222 is tilted in the "off" state direction, the portion of illumination cone 202 received by modulator 222 is reflected to a light dump 232.

In this example, the "on" state reflected light is communicated from modulator 222 in a projection light cone 204 centered around the projection ray 205 which is normal to modulator 222. Light reflected from modulator 222 in a "flat" state is communicated from modulator 222 in a "flat" state cone 206 centered around a flat state ray 207 which is displaced twenty (20) degrees from the normal of modulator 222. Light reflected from modulator 222 while tilted in the "off" state direction is communicated from modulator 22 in an "off" state cone 208 which is centered around an "off" state ray 209 which is displaced approximately forty (40) degrees from the normal of modulator 222.

Separation between illumination cone 202 and projection cone 204 advantageously minimizes interference between light source 212 and projection lens 224. Separation between projection cone 204 and "off" state cone 208 advantageously enables projection lens 224 to collect the "on" state light while minimizing interference from the "off" state light.

In this particular example, each cone 202, 204, 206, and 208 abut, but do not overlap. In a typical digital micromirror display projection system with a ten (10) degree illumination angle, the illumination cone may be approximately an F/3 cone which has a nineteen (19) degree solid cone angle, or a 9.5 degree half angle. In this example, light reflected or scattered by modulator 222 while in a flat state position is communicated in and around flat state cone 206. Any light scattered by modulator 222 in such a way that it is scattered or diffracted outside flat state cone 206 in a direction closer to the normal of modulator 222 can be located in the "on" state cone 204. This can result in degradation to the contrast ratio for the image projected by system 200.

In this example, system 200 includes an adjustable illumination aperture 226 capable of selectively varying the amount of illumination cone 202 received by modulator 222. Adjustable illumination aperture 226 can be selectively varied based at least in part on image data received by modulator 222. In one particular embodiment, aperture 226 operates to simultaneously adjust brightness and contrast of the projected image based at least in part on image data and/or ambient room environment. The structure and function of adjustable illumination aperture 226 can be substantially similar to adjustable illumination aperture 26 of FIG. 1. Selectively varying the amount of projection cone 202 received by modulator 222 can result in a proportional change to the solid cone angle or the half angle of each cone 204, 206, and 208 reflected from modulator 222. Reducing the solid cone angle of each of the reflected cones can advantageously reduce the amount of light scattered or reflected from flat state cone 206 and/or "off" state cone 208 into "on" state cone 204. Reducing the amount of light scattered or reflected from cones 206 and 208 can result in an improved contrast ratio for system 200.

FIGS. 3A and 3B illustrate one example of an adjustable translating aperture 300, showing two of its open versus closed positions. In various embodiments, the structure and function of translating aperture 300 can be substantially similar to adjustable illumination aperture 26 of FIG. 1.

An example of a suitable mechanism for implementing translating aperture 300 is similar to that used for shuttering a camera, where two vanes 304 translate by sliding farther apart or closer together. In this example, translating aperture 300 includes stationary lens holder 302 and translating vanes 304. Stationary lens holder 302 comprises an area 306 capable of passing a desired maximum amount of illumination light. Although in this example, stationary lens holder 302 comprises a circular shape, any geometric shape may be used without departing from the scope of the present disclosure. In various embodiments, holder 302 may be coated with or comprise a reflective material capable of reflecting at least a portion of the illumination light received by aperture 300. In other embodiments, holder 302 may be coated with or comprise an absorbent material capable of absorbing at least some of the illumination light received by aperture 300.

In addition, holder 302 operates to support and/or contain translating vanes 304. Translating lens 304 operates to manipulate and/or vary an amount of illumination light received by a modulator by selectively changing area 306 of holder 302. In various embodiments, vanes 304 may be coated with or comprise a reflective material capable of reflecting at least a portion of illumination light back to the light source. In other embodiments, vanes 304 may be coated with or comprise an absorbent material capable of absorbing at least some of the illumination light received by aperture 300.

Figure 4A:
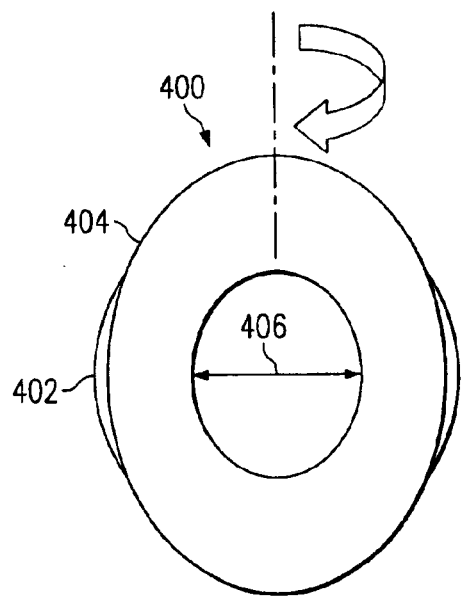
FIGS. 4A and 4B illustrate one example of an adjustable aperture comprising a rotating aperture.
Figure 4B:
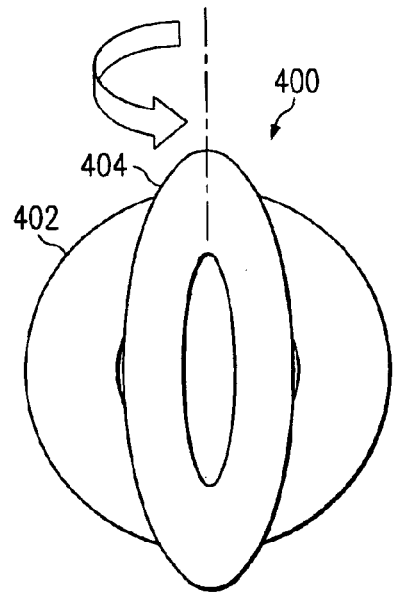

FIGS. 4A and 4B illustrate one example of an adjustable rotating aperture 400, showing two of its open versus closed positions. In various embodiments, the structure and function of rotating aperture 400 can be substantially similar to adjustable illumination aperture 26 of FIG. 1. In this example, rotating aperture 400 includes a stationary holder 402 and rotating ring 404. Stationary lens holder 402 comprises an area 406 capable of passing a desired maximum amount of illumination light. Although in this example stationary holder 402 comprises a circular shape, any geometric shape may be used without departing from the scope of the present disclosure. In various embodiments, holder 402 may be coated with or comprise a reflective material capable of reflecting at least a portion of the illumination light received by aperture 400. In other embodiments, holder 402 may be coated with or comprise an absorbent material capable of absorbing at least some of the illumination light received from the light source.

In addition, holder 402 operates to support and/or contain rotating ring 404. In this particular embodiment, ring 404 comprises a substantially circular shape that operates to block at least a portion of area 406. Ring 404 operates to manipulate and/or vary an amount of light received by modulator by selectively changing area 406 of holder 402. In various embodiments, ring 404 may be coated with or comprise a reflective material capable of reflecting at least some of the illumination light received by aperture 400. In other embodiments, ring 404 may be coated with or comprise an absorbent material capable of absorbing at least some of the light received by aperture 400.

Figure 5A:
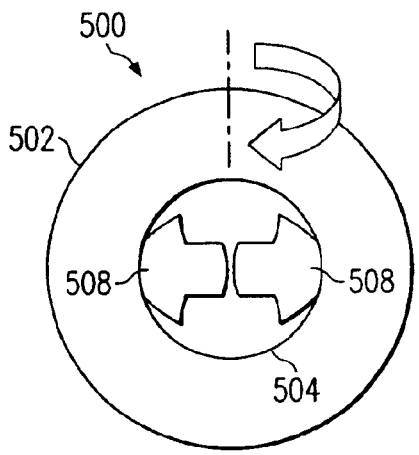
FIGS. 5A and 5B illustrate one example of an adjustable aperture comprising a rotating vane aperture.
Figure 5B:
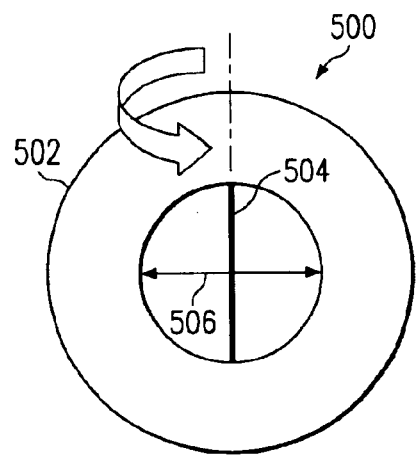

FIGS. 5A and 5B illustrate one example of an adjustable rotating vane aperture 500, showing two of its open versus closed positions. In various embodiments, the structure and function of rotating vane aperture 500 can be substantially similar to adjustable illumination aperture 26 of FIG. 1. In this example, rotating vane aperture 500 includes a stationary lens holder 502 and an asymmetric rotating vane 504. Stationary lens holder 502 comprises an area 506 capable of passing a desired maximum amount of illumination light received by aperture 500. Although in this example stationary lens holder 502 comprises a circular shape, any geometric shape may be used without departing from the scope of the present disclosure. In various embodiments, holder 502 may be coated with or comprise a reflective material capable of reflecting at least some of the illumination light source received by aperture 500. In other embodiments, holder 502 may be coated with or comprise an absorbent material capable of absorbing at least some of the illumination light received by aperture 500.

In addition, holder 502 operates to support and/or contain asymmetric rotating vane 504. In this embodiment, vane 504 comprises a substantially circular shape that operates to block at least a portion of area 506. In addition, at least a portion 508 of vane 504 is removed to permit a minimum amount of illumination light to pass when vane 504 is rotated ninety (90) degrees. Asymmetric rotating vane 504 operates to manipulate and/or vary an amount of light received by a modulator by selectively changing area 506 of holder 502. In various embodiments, asymmetric rotating vane 504 may be coated with or comprise a reflective material capable of reflecting at least a portion of illumination light received at aperture 500. In other embodiments, asymmetric rotating vane 504 may be coated with or comprise an absorbent material capable of absorbing at least a portion of the illumination light received by aperture 500.

Figure 6A:
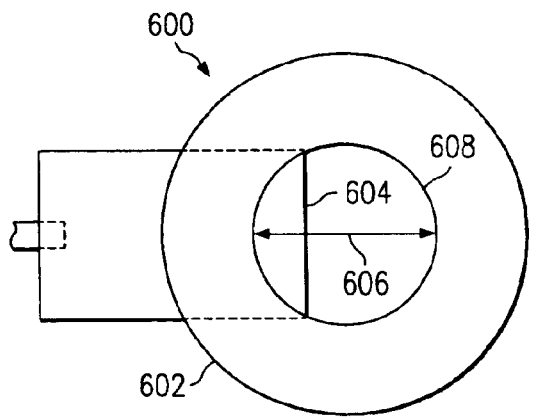
FIGS. 6A and 6B illustrate one example of an adjustable aperture comprising a sliding gate aperture.
Figure 6B:
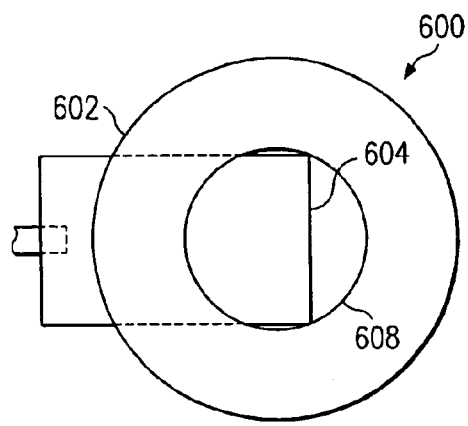

FIGS. 6A and 6B illustrate one example of an adjustable aperture comprising a sliding gate aperture 600, showing two of its open versus closed positions. In various embodiments, the structure and function of sliding gate aperture 600 can be substantially similar to adjustable illumination aperture 26 of FIG. 1. In this example, sliding gate aperture 600 includes a stationary lens holder 602 and a sliding gate 604. Stationary lens holder 602 comprises an area 606 capable of passing a desired maximum amount of illumination light received by aperture 600. Although in this example stationary lens holder 602 comprises a circular shape, any geometric shape may be used without departing from the scope of the present disclosure. In various embodiments, holder 602 may be coated with or comprise a reflective material capable of reflecting at least some of the illumination light source received by aperture 600. In other embodiments, holder 602 may be coated with or comprise an absorbent material capable of absorbing at least some of the illumination light received by aperture 600.

In addition, holder 602 operates to support and/or contain sliding gate 604. In this embodiment, gate 604 comprises a substantially rectangular shape that operates to block at least a portion of area 606. Sliding gate 604 operates to manipulate and/or vary an amount of light received by a modulator by selectively changing area 606 of holder 602. In various embodiments, sliding gate 604 may be coated with or comprise a reflective material capable of reflecting at least a portion of illumination light received at aperture 600. In other embodiments, sliding gate 604 may be coated with or comprise an absorbent material capable of absorbing at least a portion of the illumination light received by aperture 600.

In operation, aperture 600 operates to block one side of the illumination light received by aperture 600. Aperture 600 can advantageously be used as a projection aperture where the projection optics have a less well defined stop in illumination relay or that exhibit lamp recycling of aperture light.

Each of the above-described apertures, as illustrated, is "asymmetrical" in the sense that, in all or some of its positions, the aperture is not circular. This asymmetry, while not necessary to the operation of the present invention, may be useful for reasons particular to the DMD, such as its tilt angle or illumination angle. Furthermore, although the apertures of FIGS. 3 and 4 have a curved "cateye" shape, the edges of the aperture stop could be straight rather than curved. In general, the aperture opening formed by the apertures may be a wide variety of shapes.

Referring again to FIG. 2, it can be seen that the amount of light in the illumination path can be altered by rotating aperture 226 relative to the axis of the illumination cone 202, as well as by changing the aperture size by opening and closing. By affecting the symmetry of the illumination cone that reaches the DMD 222, the amount of illumination may be varied. This method of modulation could be used in addition to, or alternatively to, aperture size modulation.

Although the present invention has been described in several embodiments, a myriad of changes, variations, alterations, transformations, and modifications may be suggested to one skilled in the art, and it is intended that the present invention encompass such changes, variations, alterations, transformations, and modifications as falling within the spirit and scope of the appended claims.

What is claimed is:

1. An image display system, comprising:
   a light source capable of generating an illumination light beam along an illumination path;
   a spatial light modulator comprised of an array of elements operable to deflect about an axis, said elements operable receive at least a portion of the illumination light beam and to communicate at least some of the illumination light beam received by the modulator along a projection light path;
   at least one adjustable illumination aperture having an opening larger in a direction parallel to the axis than in a direction perpendicular to the axis and operable to selectively control an amount of the at least a portion of the illumination light beam received by the modulator; and at least one adjustable projection aperture having an opening larger in a direction parallel to the axis than in a direction perpendicular to the axis and operable to selectively control an amount of the light communicated along the projection light path.

2. The system of claim 1, wherein the modulator comprises a device selected from a group consisting of a digital micromirror device, a reflective liquid crystal modulator, and a light emitting diode modulator.

3. The system of claim 1, wherein the at least one adjustable illumination aperture comprises a device selected from a group consisting of a translating aperture, a rotating aperture, a sliding gate aperture, and a rotating vane aperture.

4. The system of claim 1, wherein the at least one adjustable illumination aperture selectively controls the amount of the illumination beam based at least in part on image data.

5. The system of claim 4, wherein the image data comprises data selected from a group consisting of an image content of an image frame, a color content of an image frame, an integrated intensity of an image frame, a peak-to-peak intensity value of an image frame, and subjectively weighted area.

6. The system of claim 1, wherein the at least one adjustable illumination aperture selectively controls the amount of the illumination light beam based at least in part on image data and an ambient room environment.

7. The system of claim 1, further comprising:
a control module operable to generate a control signal based at least in part on an image intensity algorithm;
a feedback loop operable to communicate the image data from a processor to the control module for use in the image intensity algorithm; and
a servo-motor operable to position the at least one adjustable illumination aperture based at least in part the control signal generated by the control module.

8. The system of claim 7, wherein the image intensity algorithm is based at least in part on an ambient environment.

9. The system of claim 1, wherein the at least one adjustable projection aperture comprises a device selected from a group consisting of a translating aperture, a rotating aperture, a sliding gate aperture, and a rotating vane aperture.

10. The system of claim 1, wherein the at least one adjustable projection aperture selectively controls the amount of the illumination light beam based at least in part on image data and an ambient room environment.

11. The system of claim 10, wherein the image data comprises data selected from a group consisting of an image content of an image fame, a color content of an image frame, an integrated intensity of an image frame, a peak-to-peak intensity value of an image frame, and subjectively weighted area.

12. A method of displaying an image, comprising:
generating an illumination light beam along an illumination path;
receiving at least a portion of the illumination light beam at a spatial light modulator;
selectively communicating at least some of the illumination light beam received by the modulator along a projection light path using an array of elements operable to rotate about an axis;
selectively controlling an amount of the illumination light beam communicated along said projection light path using at least one illumination aperture having an opening larger in a direction parallel to the axis than in a direction perpendicular to the axis and at least one projection aperture having an opening larger in a direction parallel to the axis than in a direction perpendicular to the axis;
wherein the selectively controlling step is in response to data from a group consisting of image data and an ambient room environment.

13. The method of claim 12, wherein the selectively controlling step is performed at least on a frame-by-frame basis of display data.

14. The method of claim 12, wherein the selectively controlling step is performed at a modulation rate faster than a modulation rate of the spatial light modulator.

15. The method of claim 12, wherein the selectively controlling step to selectively vary an intensity of the illumination light beam, while substantially maintaining a constant contrast ratio.

16. The method of claim 12, wherein the image data comprises data selected from a group consisting of an image content of an image frame, a color content of an image frame, an integrated intensity of an image frame, a peak-to-peak intensity value of an image frame, and subjectively weighted area.

17. The method of claim 12, wherein the selectively controlling step is performed by changing the size of an opening created by at least one said at least one aperture.

18. The method of claim 12, wherein the selectively controlling step is performed by rotating at least one said at least one aperture relative to a cone of light.

* * * * *